United States Patent
Tatsumi

(10) Patent No.: US 6,476,404 B1
(45) Date of Patent: Nov. 5, 2002

(54) IMAGE READING APPARATUS FOR READING AN IMAGE ON A PHOTOSENSITIVE MATERIAL IN WHICH SILVER HALIDE AND/OR DEVELOPING SILVER REMAINS

(75) Inventor: Setsuji Tatsumi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/173,759

(22) Filed: Oct. 16, 1998

(30) Foreign Application Priority Data

Oct. 17, 1997 (JP) .............................................. 9-285601

(51) Int. Cl.⁷ ............................................. G01N 21/86
(52) U.S. Cl. .................................. 250/559.02; 430/360
(58) Field of Search ................................ 250/226, 559, 250/559.4; 358/518–523; 430/362, 360; 356/404; 348/234; 382/167

(56) References Cited

U.S. PATENT DOCUMENTS 5,200,301 A * 4/1993 Wingender et al. ......... 430/373
5,391,443 A * 2/1995 Simons et al. ................. 430/21
5,582,961 A * 12/1996 Giorgianni et al. ......... 430/508

* cited by examiner

Primary Examiner—Que T. Le
Assistant Examiner—Thanh X. Luu
(74) Attorney, Agent, or Firm—Sughrue Mion, PLLC

(57) ABSTRACT

When color image information including silver image information is photoelectrically read, the deterioration of image quality caused by a silver image is corrected to thereby obtain a high-quality image. In an image reading apparatus 100 for reading an image on a color silver salt photosensitive material in which silver halide and/or developing silver remains, there are provided: a CCD 113 for photoelectrically reading the image on the photosensitive material F in accordance with the spectral sensitivity of the photosensitive material F; and a color correcting portion 121 for correcting the deterioration of image quality caused by silver halide and/or developing silver for each of the color outputs of the CCD 113.

8 Claims, 2 Drawing Sheets

IMAGE READING APPARATUS FOR READING AN IMAGE ON A PHOTOSENSITIVE MATERIAL IN WHICH SILVER HALIDE AND/OR DEVELOPING SILVER REMAINS

BACKGROUND OF THE INVENTION

The present invention relates to an image reading apparatus for reading an image recorded on a color photosensitive material in which silver halide and/or developing silver remains.

In recent years for the purpose of reduction in the treating time as well as the treating cost, there is known a technique in which color image information including developing silver information is photoelectrically read and converted into a digital signal without removal of silver halide and developing silver on the basis of a color image obtained by exposure and Development to thereby obtain a color image on another recording material.

Image information carried by a photosensitive material, however, includes silver image information. Accordingly, a system in which the image information is projected and exposed onto another recording material is unsuitable for an image requiring high image quality, because, it is a matter of course that the silver image information is also exposed at the same time.

On the other hand, in a system in which image information carried by a photosensitive material is photoelectrically read so that an image is obtained by scanning-exposure on another recording material on the basis of the photoelectrically read image information, the image information thus read can be corrected suitably. Accordingly, silver image information can be removed from color image information to obtain a high-quality image.

SUMMARY OF THE INVENTION

The present invention is designed to take the aforementioned circumstances into consideration and has an object to provide an image reading apparatus in which the deterioration of image quality caused by a silver image is corrected so that a high-quality image can be obtained even when color image information including silver image information is photoelectrically read.

According to the present invention, there is provided an image reading apparatus for reading an image on a color silver salt photosensitive material in which silver halide and/or developing silver remains, the image reading apparatus comprising: photoelectric converting means for photoelectrically reading the image on the color silver salt photosensitive material in accordance with a spectral sensitivity of the color silver salt photosensitive material, and for sending color outputs; and color correcting means for correcting deterioration of image quality caused by silver halide and/or developing silver with respect to each of the color outputs sent by the photoelectric converting means.

According to such an image reading apparatus, a high-quality image free from the influence of the silver image can be obtained because color correction is applied to the image information read by the photoelectric converting means so that deterioration caused by the silver image is corrected by the color correcting means.

As the color correcting means for correcting deterioration caused by the silver image, an inter-color arithmetic operation of subtracting a silver image's component from each of color outputs of the photoelectric converting means is executed so that a desired color image after cancellation of the silver image's component can be obtained.

Alternatively, a conversion table on which each of the color outputs of the color image reading means is made to correspond to a silver image's component contained in the color output may be used to thereby obtain a desired color information after cancellation of the silver image's component.

Incidentally, color muddiness occurs in the color output including silver image information. Accordingly, color correction is performed to cancel the information of the silver image's component and to enhance the chroma of the color so that the loss of color chroma caused by the silver image's component can be compensated.

A material described below may be used as the color silver salt photosensitive material in which silver halide and/or developing silver remains.

That is, in the image reading apparatus of the invention, the color silver salt photosensitive material disclosed in Japanese Patent Application No. Hei. 7-234600 may be used, in which the color silver salt photosensitive material includes at least three kinds of photosensitive layers formed on a substrate, each of the photosensitive layers containing at least photosensitive silver halide, a binder, and a non-dispersive color material for emitting a dispersive pigment corresponding or inversely corresponding to silver development, the photosensitive layers being different from one another both in the photosensitive wavelength region and in the hue of the color material after being developed.

Further, in the image reading apparatus of the invention, the color silver salt photosensitive material disclosed in Japanese Patent Application No. Hei-7-268045 may be used, in which the color silver salt photosensitive material includes at least three kinds of photosensitive layers on a substrate, each of the photosensitive layers containing at least photosensitive silver halide, binder, and a pigment-donating coupler, the photosensitive layers being different from one another both in the photosensitive wavelength region and in the hue of the pigment formed from the pigment-donating coupler.

The whole or part of an "image reading apparatus" described in JP-A-7-15593 may be used as an apparatus for reading an image on a photosensitive material. This apparatus is designed so that transparent original copy such as a negative film, or the like, is photoelectrically read by a photoelectric converting means such as a CCD, or the like. Further, in the present invention, color correction for canceling the silver image's component as described above is applied to the image read by the photoelectric converting means.

DETAILED DESCRIPTION OF PREFERRED EMBODIMENTS

An embodiment of the present invention will be described below with reference to the drawings.

Figure 1:
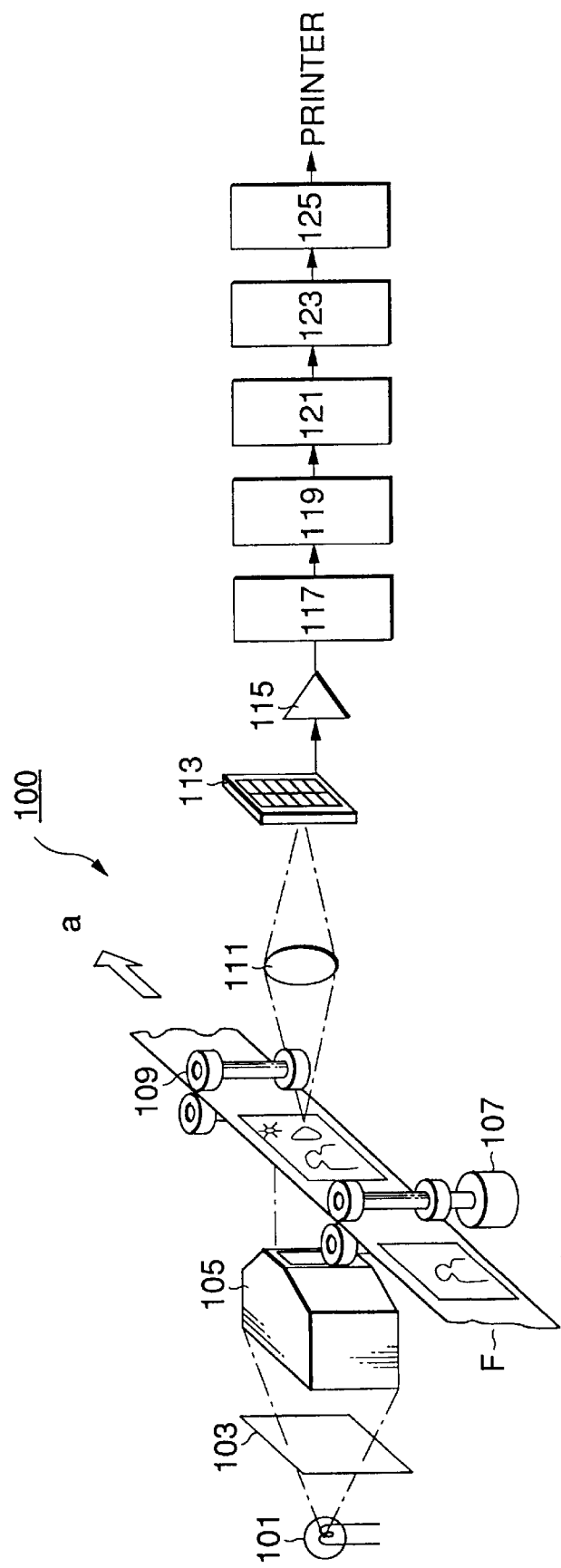
FIG. 1 is a diagram showing an embodiment of the present invention.

As shown in FIG. 1, an image reading apparatus 100 comprises a light source 101, a filter portion 103, a beam condensing portion 105, carrying roller pairs 107 and 109, an image forming lens 111 and a CCD 113. The image reading apparatus 100 reads an image on a photosensitive material F photoelectrically.

Respective color image information of respective colors (R, G and B) read from the image on the photosensitive material F by the CCD 113 is amplified by an amplifier 115 and converted into digital signals by an analog/digital (A/D) converter 117. After errors in respective pixels and variations in dark current in the CCD 113 are then corrected by a CCD correcting portion 119, the image information is subjected to color correction by a color correcting portion 121 to cancel silver image's information and subjected to density conversion by a density converting portion 123. Then, the image information is subjected to magnification conversion and sharpness emphasis by a magnification converting portion 125, and then transmitted to a printer.

Incidentally, in the case of reading an image on the photosensitive material F, the image on the photosensitive material F may be roughly read in advance so that various kinds of parameters for actually reading the image are set on the basis of this information.

The color correcting portion 121 will be described below.

The present invention has an object to cancel the influence of a silver image to accurately read an image contained in a photosensitive material in which silver halide and/or developing silver remains. For this reason, the deterioration of image quality caused by the silver image is corrected in the respective color outputs of the CCD 113 by the color correcting portion 121.

Here, components constituting the image contained in the photosensitive material in which silver halide and/or developing silver remains, are color materials of C (cyan), M (magenta) and Y (yellow) and remaining silver halide and/or developing silver.

Of these components, absorption of silver halide is negligibly small in comparison with the absorption of the other components. Accordingly, the absorption of the respective color materials and developing silver is regarded as a subject here.

Further, the quantity of remaining developing silver has a predetermined correlation with each color-developed color material. Accordingly, if the correlation between the density of each color-developed color material and the density of remaining developing silver is measured for each color in advance, and if the density of the color-developed color material is found, the density of remaining developing silver corresponding to the density of the color-developed color material can be found.

Figure 2:
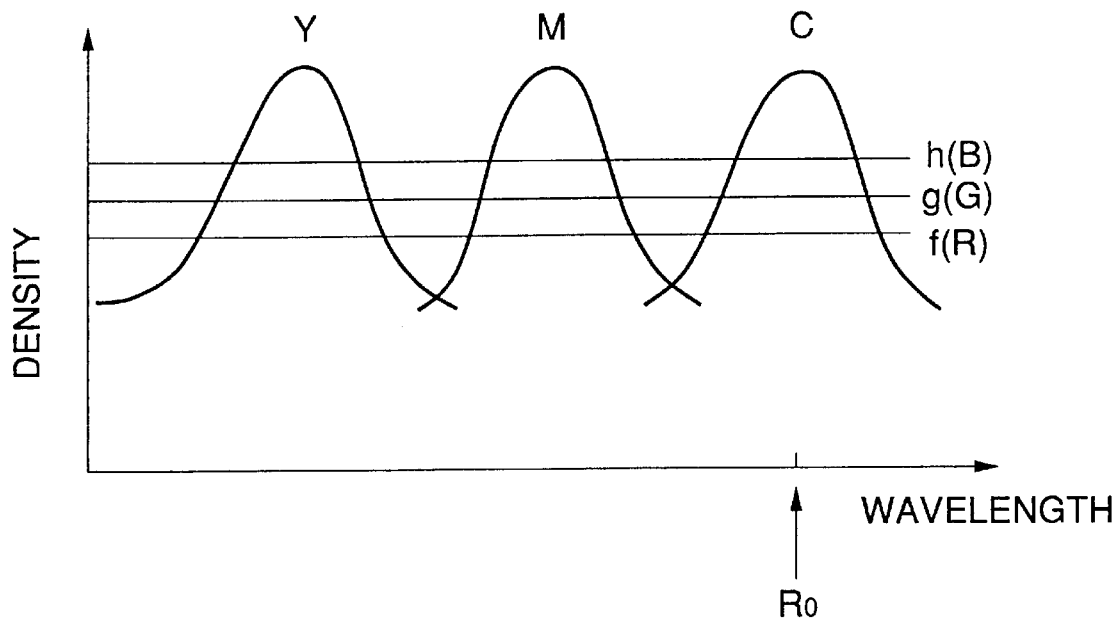
FIG. 2 is a view showing the spectral extinction characteristic of a photosensitive material used in the present invention.

FIG. 2 shows the spectral extinction characteristic of a photosensitive material in which silver halide and/or developing silver remains. Here, f(R), g(G) and h(B) show the densities of developing silver contained in the colors respectively. When an image in the photosensitive material with the characteristic shown in FIG. 2 is to be read, for example, the following operational expression is established on the read value ($R_0$) of the CCD corresponding to R (red).

The read value ($R_0$) of the CCD corresponding to R (red)=(the quantity of color development of the color material (C), generated in the R-sensitive layer)+(the silver image generated in the R (red)-sensitive layer)+(the silver image generated in the G (green)-sensitive layer)+(the silver image generated in the B (blue)-sensitive layer)

Accordingly, if the density caused by silver images of the three-layers is subtracted from the read value ($R_0$) of the CCD corresponding to R, the density only based on the quantity of color development of the color material (C) generated in the R-sensitive layer is obtained.

Incidentally, the spectral extinction characteristic of developing silver is substantially flat. Accordingly, the sum of the densities f(R), g(G) and h(B) of developing silver corresponding to the densities of color development of the color materials C, M and Y measured in advance may be subtracted from the read value ($R_0$) of the CCD corresponding to each layer.

That is, the quantity (R) of color development of the color material (C) generated in the R-sensitive layer is given by the following expression.

$$R = R_0 - f(R) - g(G) - h(B)$$

Figure 3:
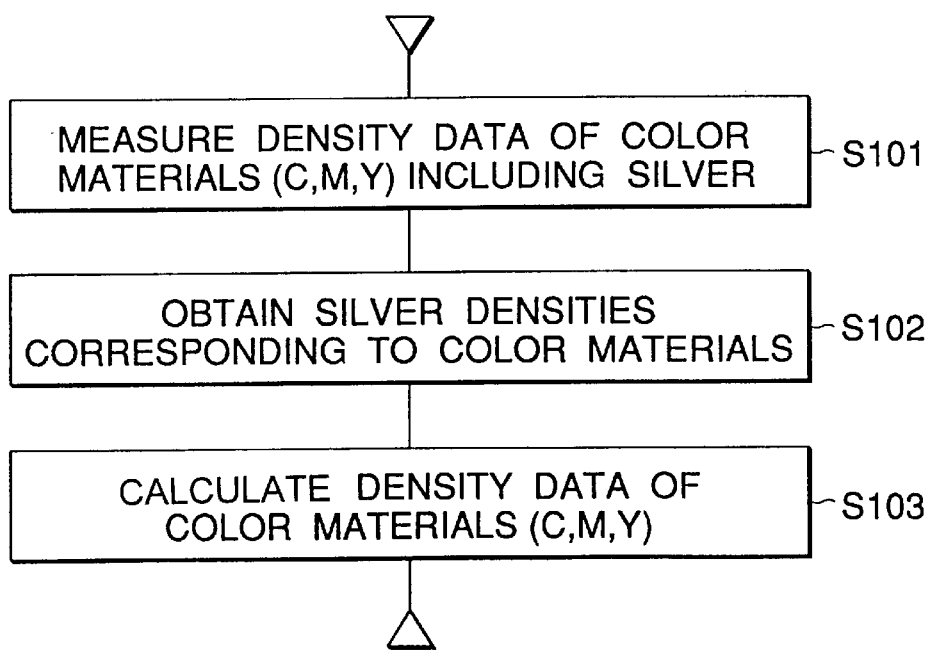
FIG. 3 is a flow chart showing a procedure for obtaining the quantities of color development of respective color materials.

FIG. 3 shows a procedure for obtaining the quantities of color development of the color materials by use of the densities f(R), g(G) and h(B) of developing silver corresponding to the preliminarily measured densities of color development of the color materials C, M and Y.

First, data about the densities of the color materials (C, M and Y) each including the density of developing silver are measured on the basis of a predetermined measurement wavelength (S101). Then, the densities f(R), g(G) and h(B) of developing silver corresponding to the densities of the color materials (C, M and Y) are obtained (S102). Arithmetic operations, for example, as represented by the following operational expressions are executed on the basis of the densities of developing silver (S103).

Assume now that the read values of the CCD corresponding to the respective layers, that is, the R-sensitive layer, the G-sensitive layer and the B-sensitive layer, are $R_0$, $G_0$ and $B_0$ respectively. Then, the quantities of color development of the color materials can be given by the following calculation expressions on the basis of measured results of the correlation between the density of each color-developed color material and the density of remaining developing silver.

$$R = 3 \times R_0 - G_0 - B_0$$

$$G = -R_0 + 3 \times G_0 - B_0$$

$$B = -G_0 + 3 \times B_0$$

Incidentally, the calculation expressions are taken as an example. If more detailed coefficients are determined, more accurate image density can be calculated. As an expression, the form of a 3×3 matrix of three colors may be used.

Further, a look-up table (conversion table) corresponding to the calculation expressions may be prepared instead of use of the calculation expressions so that image density can be also determined on the basis of the look-up table.

Incidentally, because the influence of developing silver on the image has a tendency to muddy the color, correction is preferably performed to enhance the chroma of the color.

As described above, according to the present invention, when an image on a color silver salt photosensitive material in which silver halide and/or developing silver remains, a high-quality image free from the influence of the silver image can be obtained because color correction is applied to the image information read by the photoelectric converting means so that deterioration caused by the silver image is corrected by the color correcting means.

What is claimed is:

1. An image reading apparatus for reading an image on a color silver salt photosensitive material in which silver halide and/or developing silver remains, the image reading apparatus comprising:

photoelectric converting means for photoelectrically reading the image on the color silver salt photosensitive material in accordance with a spectral sensitivity of visible light range and for sending color outputs, and color correcting means for correcting deterioration of image quality caused by silver halide and/or developing silver with respect to each of the color outputs sent by the photoelectric converting means, wherein the color correcting means executes, for each color output, an arithmetic operation of subtracting a silver image's component of each of the color outputs.

2. An image reading apparatus for reading an image on a color silver salt photosensitive material in which silver halide and/or developing silver remains, the image reading apparatus comprising:

photoelectric converting means for photoelectrically reading the image on the color silver salt photosensitive material in accordance with a spectral sensitivity of visible light range and for sending color outputs; and color correcting means for correcting deterioration of image quality caused by silver halide and/or developing silver with respect to each of the color outputs sent by the photoelectric converting means, wherein the color correcting means has a conversion table which receives each of the color outputs of the photoelectric converting means.

3. An image reading apparatus for reading an image on a color silver salt photosensitive material in which silver halide and/or developing silver remains, the image reading apparatus comprising:

photoelectric converting means for photoelectrically reading the image on the color silver salt photosensitive material in accordance with a spectral sensitivity of visible light range and for sending color outputs; and color correcting means for correcting deterioration of image quality caused by silver halide and/or developing silver with respect to each of the color outputs sent by the photoelectric converting means, wherein the color correcting means performs color correction to enhance the color chroma of the image read by the photoelectric converting means.

4. An image reading system comprising:

a color silver salt photosensitive material in which silver halide and/or developing silver remains, the color silver salt photosensitive material having an image;

photoelectric converting means for photoelectrically reading the image on the color silver salt photosensitive material in accordance with a spectral sensitivity of the color silver salt photosensitive material, and for sending color outputs; and color correcting means for correcting deterioration of image quality caused by silver halide and/or developing silver with respect to each of the color outputs sent by the photoelectric converting means, wherein the color correcting means executes, for each color output, an arithmetic operation of subtracting a silver image's component of each of the color outputs.

5. An image reading system comprising:

a color silver salt photosensitive material in which silver halide and/or developing silver remains, the color silver salt photosensitive material having an image;

photoelectric converting means for photoelectrically reading the image on the color silver salt photosensitive material in accordance with a spectral sensitivity of the color silver salt photosensitive material, and for sending color outputs; and color correcting means for correcting deterioration of image quality caused by silver halide and/or developing silver with respect to each of the color outputs sent by the photoelectric converting means, wherein the color correcting means has a conversion table which receives each of the color outputs of the photoelectric converting means.

6. An image reading system comprising:

a color silver salt photosensitive material in which silver halide and/or developing silver remains, the color silver salt photosensitive material having all image;

photoelectric converting means for photoelectrically reading the image on the color silver salt photosensitive material in accordance win a spectral sensitivity of the color silver salt photosensitive material, and for sending color outputs; and color correcting means for correcting deterioration of image quality caused by silver halide and/or developing silver with respect to each of the color outputs sent by the photoelectric converting means, wherein the color correcting means performs color correction to enhance the color chroma of the image read by the photoelectric converting means.

7. The image reading system according to claim 6, wherein the color silver salt photosensitive material includes a substrate and at least three kinds of photosensitive layers formed on the substrate, each of the photosensitive layers having at least photosensitive silver halide, a binder, and a non-dispersive color material for emitting a dispersive pigment corresponding or inversely corresponding to silver development, and wherein the photosensitive layers are different from one another both in a photosensitive wavelength region and in a hue of the color materials after being developed.

8. The image reading system according to claim 6, wherein the a color silver salt photosensitive material includes a substrate and at least three kinds of photosensitive layers on the substrate, each of the photosensitive layers containing at least photosensitive silver halide, a binder, and a pigment-donating coupler, and wherein the photosensitive layers are different from one another both in a photosensitive wavelength region and in a hue of a pigment formed from the pigment-donating coupler.

\* \* \* \* \*